(12) United States Patent
Acharya

(10) Patent No.: US 8,645,366 B1
(45) Date of Patent: Feb. 4, 2014

(54) GENERATING RECOMMENDATIONS OF POINTS OF INTEREST

(75) Inventor: Anish Acharya, San Francisco, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/363,275

(22) Filed: Jan. 31, 2012

Related U.S. Application Data

(60) Provisional application No. 61/582,106, filed on Dec. 30, 2011.

(51) Int. Cl.
*G06F 17/30* (2006.01)
(52) U.S. Cl.
USPC .......................................................... 707/723
(58) Field of Classification Search
USPC .................................. 707/706, 723, 728, 748
See application file for complete search history.

(56) References Cited

U.S. PATENT DOCUMENTS

| 7,765,259 | B2 * | 7/2010 | MacVarish | 709/204 |
|---|---|---|---|---|
| 8,521,734 | B2 * | 8/2013 | Walther et al. | 707/732 |
| 2007/0185858 | A1 * | 8/2007 | Lu et al. | 707/5 |
| 2010/0174709 | A1 * | 7/2010 | Hansen et al. | 707/728 |
| 2011/0010364 | A1 * | 1/2011 | Ahtisaari et al. | 707/724 |
| 2011/0022602 | A1 * | 1/2011 | Luo et al. | 707/748 |
| 2011/0143775 | A1 * | 6/2011 | Liu et al. | 455/456.3 |
| 2011/0165888 | A1 * | 7/2011 | Shuman et al. | 455/456.1 |
| 2011/0201317 | A1 * | 8/2011 | Karandikar et al. | 455/414.1 |
| 2011/0238690 | A1 * | 9/2011 | Arrasvuori et al. | 707/769 |
| 2012/0084280 | A1 * | 4/2012 | Bouzas et al. | 707/723 |
| 2012/0089617 | A1 * | 4/2012 | Frey | 707/748 |

* cited by examiner

*Primary Examiner* — Cam-Linh Nguyen
(74) *Attorney, Agent, or Firm* — McDermott Will & Emery LLP

(57) ABSTRACT

Systems and methods for generating recommendations of points of interest to visit are provided. In some aspects, a method includes receiving a request to search for a point of interest recommendation, wherein the request comprises a query and a geographic region, and a social network group. The method also includes generating a set of points of interest associated with the query. The method further includes placing the points of interest within the set of points of interest in an order based on whether the expression of interest is by a member of the social network group.

14 Claims, 6 Drawing Sheets

GENERATING RECOMMENDATIONS OF POINTS OF INTEREST

CROSS-REFERENCE TO RELATED APPLICATIONS

This application claims priority under 35 U.S.C. §119(e) and the benefit of U.S. Provisional Application No. 61/582,106, filed Dec. 30, 2011, the entire disclosure of which is incorporated herein in its entirety.

BACKGROUND

The subject technology generally relates to generating recommendations of points of interest.

People visit different points of interest (POIs), such as business and parks. Oftentimes, people use Internet databases including point of interest reviews to determine which points of interest to visit.

SUMMARY

In one aspect, the disclosed subject matter can be embodied in a method that includes receiving a request to search for a point of interest recommendation. The request comprises a query and a geographic region, and is associated with a social network group which comprises a set of members using a social networking service. The method also includes generating a set of points of interest associated with the query, and each point of interest in the set of points of interest is associated with a geographic location in the geographic region. The method also includes placing the points of interest within the set of points of interest in an order based on the relevance of the points of interest to the request. The relevance of each point of interest is based on whether the point of interest includes an expression of interest, and is further based on whether the expression of interest is by a member of the social network group. The method further includes providing for display at least a subset of the set of points of interest based on the order.

In one aspect, the disclosed subject matter can be embodied in a non-transitory computer-readable medium that includes instructions. The instructions include code for receiving a request to search for a point of interest recommendation. The request comprises a query, a geographic region, and a social network group which comprises a set of members using a social networking service. The instructions include code for generating a set of points of interest associated with the query, and each point of interest in the set of points of interest is associated with a geographic location in the geographic region. The instructions include code for placing the points of interest within the set of points of interest in an order based on the relevance of the points of interest to the request. The relevance of each point of interest is based on whether the point of interest includes an expression of interest, and is further based on whether the expression of interest is by a member of the social network group. The instructions include code for providing for display at least a subset of the set of points of interest based on the order.

In one aspect, the disclosed subject matter can be embodied in a system that includes a computer. The computer includes an input module for receiving a request to search for a point of interest recommendation. The request comprises a query and a geographic region, and is associated with a social network group which comprises a set of members using a social networking service. The computer also includes a search module for generating a set of points of interest associated with the query and for placing the points of interest within the set of points of interest in an order based on whether the point of interest includes an expression of interest is by a member of the social network group. The computer further includes an output module for providing for display at least a subset of the set of points of interest based on the order.

Various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
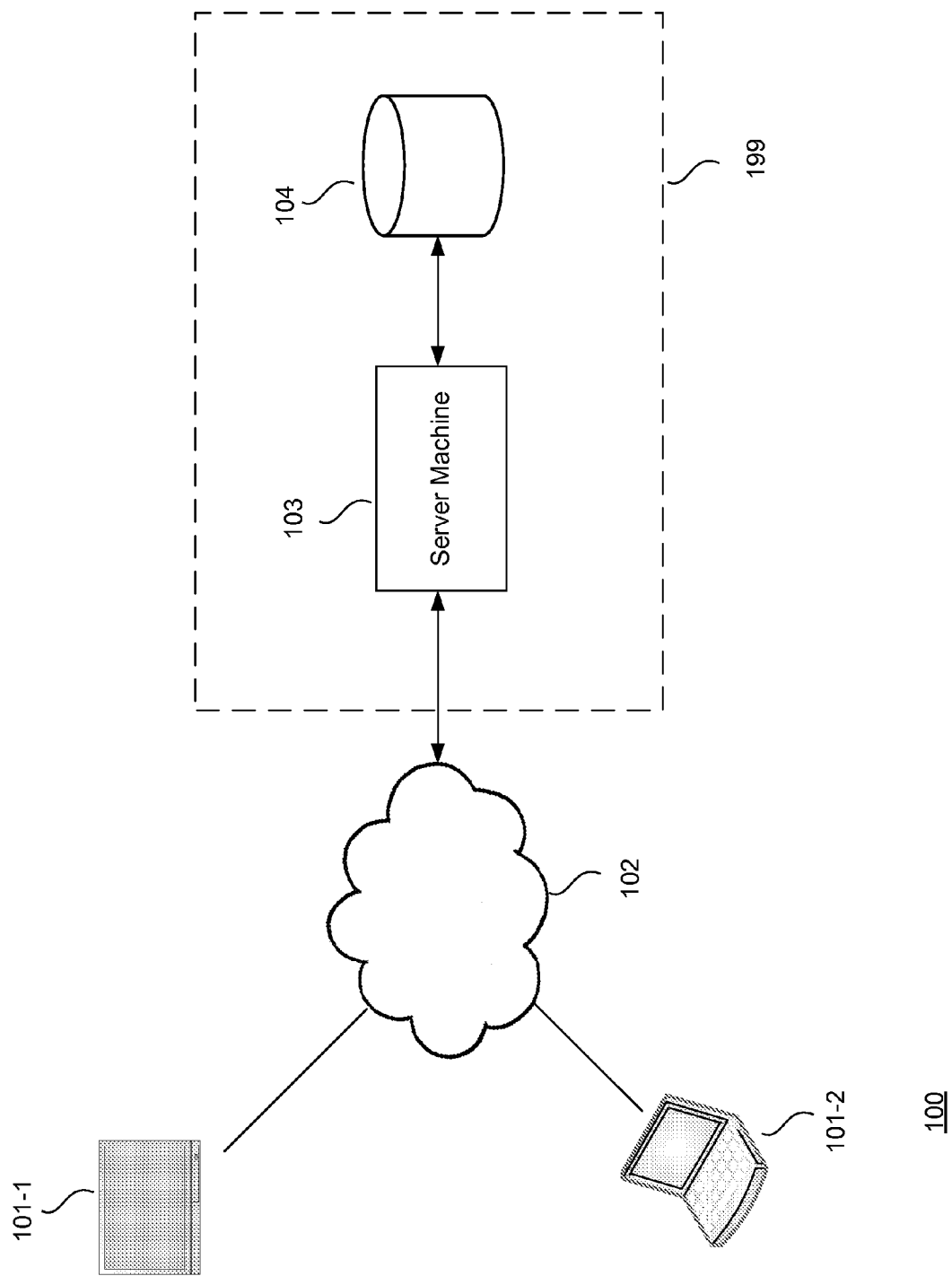
FIG. 1 illustrates a block diagram of an example system for generating recommendations of points of interest.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The information in the current Internet databases including point of interest reviews may not be reliable or trustworthy, as the end-user is unfamiliar with the source of the information and has no way to judge the trustworthiness or expertise of the source. Therefore, a technique for generating recommendations of points of interest by reliable or trustworthy sources may be desirable.

The subject technology may be implemented in conjunction with a social networking service, which stores one or more social network groups (e.g., social circles) associated with an end-user. The end-user may search for points of interest ("POI") on a web page associated with the social networking service by providing a query (e.g., "Indian restaurant") and a geographic region (e.g., within 25 miles of Palo Alto, Calif.). In response, a server machine may generate a set of points of interest that are associated with the query and are located within the geographic region. Some of the points of interest may be associated with expressions of interest by members of the social networking service, some of whom may be in one or more social network groups of the end-user.

Expressions of interest may include: indications of preference, indications of presence or reviews. The server machine would rank the POIs within the set of POIs. A highest rank may be assigned to a subset of POIs that include expressions of interest by members of one or more social network groups of the end-user ("social network group members"). A next highest rank may be assigned to a subset of POIs that include expressions of interest by other members of the social networking service who are not members of one or more social network groups of the end-user ("social network group nonmembers"). A lowest rank may be assigned to a subset of POIs that do not include any expressions of interest by members of the social networking service.

In addition, each of the ranks above may be subdivided into sub-ranks based on the expertise of the member providing the expression of interests, as determined by the interaction of the member with content inside or outside the social networking service. For example, a first member of a social network group of the end-user may have indicated presence in twenty Indian restaurants, indicated a preference for ten Indian restaurants, and written reviews for five Indian restaurants, while a second member of a social network group of the end-user may have only indicated presence in one Indian restaurant. Based on this information, it may be concluded that the first member is an expert on Indian restaurants, while the second member is not an expert on Indian restaurants. As a result, in response to a query for "Indian restaurant" by the end-user, expressions of interest by the first member may be assigned a higher sub-rank than expressions of interest by the second member.

A determination that a member is an expert may also be based on interactions with data similar to the query. For example, if a third member of a social network group of the end-user wrote a review of two pairs of soccer sneakers, purchased a soccer ball, and indicated her presence in three soccer fields while a fourth member of a social network group of the end-user indicated a preference for only one soccer field, the third member may be considered an expert on any soccer-related topic. As a result, in response to a query for "soccer field" by the end-user, expressions of interest by the third member may be assigned a higher sub-rank than expressions of interest by the fourth member.

FIG. 1 illustrates a block diagram of an example system for generating recommendations of points of interest. As shown, a plurality of user devices, such as user devices 101-1 and 101-2, are coupled to a POI recommendation system 199 via a network 102. The network 102 may be, the Internet, an intranet, a local area network or a cellular network. The POI recommendation system 199 may have a server machine 103 and a database 104 coupled to the server machine 103. An end-user may provide an expression of interest at the user device 101-1 or 101-2, e.g., by indicating presence at a POI, by indicating a preference for a POI, by writing reviews of a POI, by giving a score to a POI, by following a POI, by joining a group related to a POI, by following a person's post about a POI, by commenting on a blog post about a POI, or by reading a document about a POI. The end-user may also input a query to search for a POI at the user device 101-1 or 101-2. The server machine 103 may receive expressions of interest and store them in the database 104. The server machine 103 may also receive a request to search for a POI, search the database 104 for POIs matching the request, rank matching POIs based on whether a POI includes an expression of interest from a social network group member or a social network group nonmember, and display the ranked POIs. The server machine 103 may put POIs with expressions of interest by social network group members into a highest ranking subset, POIs with expressions of interest by social network group nonmembers into a second highest ranking subset, and POIs with no expression of interest of members of the social networking service into the lowest ranking subset. The server machine 103 may also assign sub-ranks to POIs within each subset, giving POIs with expressions of interest of experts the highest sub-rank in that subset. The database 104 may store information about POIs (e.g., tags, geographic locations and expressions of interest of social network group members and social network group nonmembers). The database 104 may also store information about social network groups (e.g., member lists).

Figure 2:
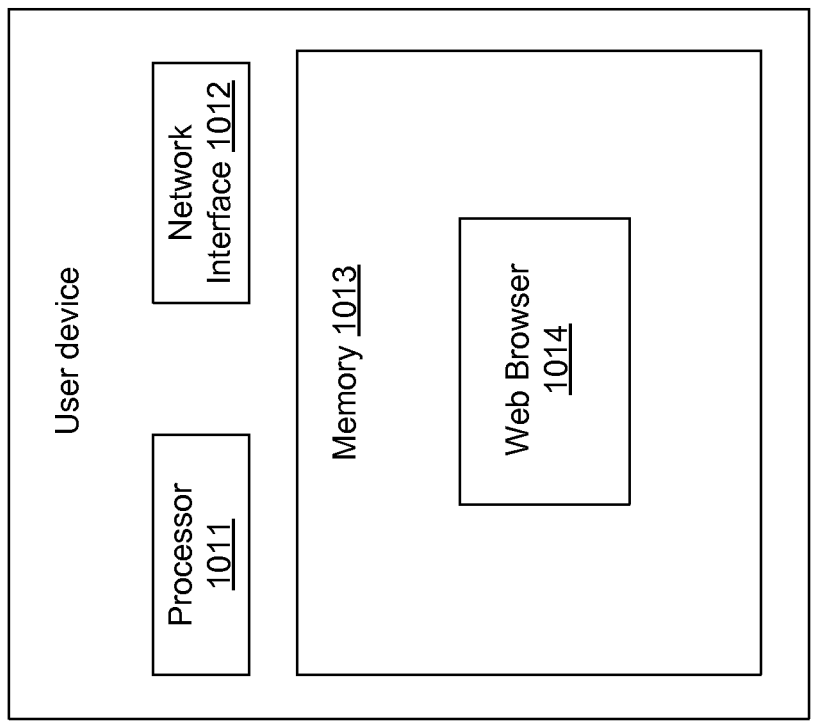
FIG. 2 illustrates a block diagram of an example of a user device shown in FIG. 1.

FIG. 2 illustrates a block diagram of an example of a user device 101-1 shown in FIG. 1. As shown, the user device 101-1 may include a processor 1011, a network interface 1012 and a memory 1013. The processor 1011 is configured to execute computer instructions that are stored in a computer-readable medium, for example, the memory 1013. The processor 1011 may be a central processing unit (CPU). The network interface 1012 is configured to allow the user device 101-1 to transmit and receive data in the network 102. The network interface 1012 may include one or more network interface cards (NICs). The memory 1013 stores data and instructions. As illustrated, the memory 1013 may store a web browser 1014. An end-user may interact with a social networking site via the web browser 1014. For example, the end-user may browse the social networking site, create social network groups or circles, add members to the social network groups, tag a POI, indicate presence at a POI, indicate a preference for a POI, write a review of a POI, or search for POIs.

The user device 101-1 may be any computing device capable of displaying content, for example, via a web browser or via a specialized application. The user device 101-1 may be a laptop computer, a desktop computer, a mobile phone, a personal digital assistant (PDA), a tablet computer, a netbook, a physical machine or a virtual machine. Persons skilled in the art will recognize other devices that could implement the functionalities of the user device 101-1.

Figure 3:
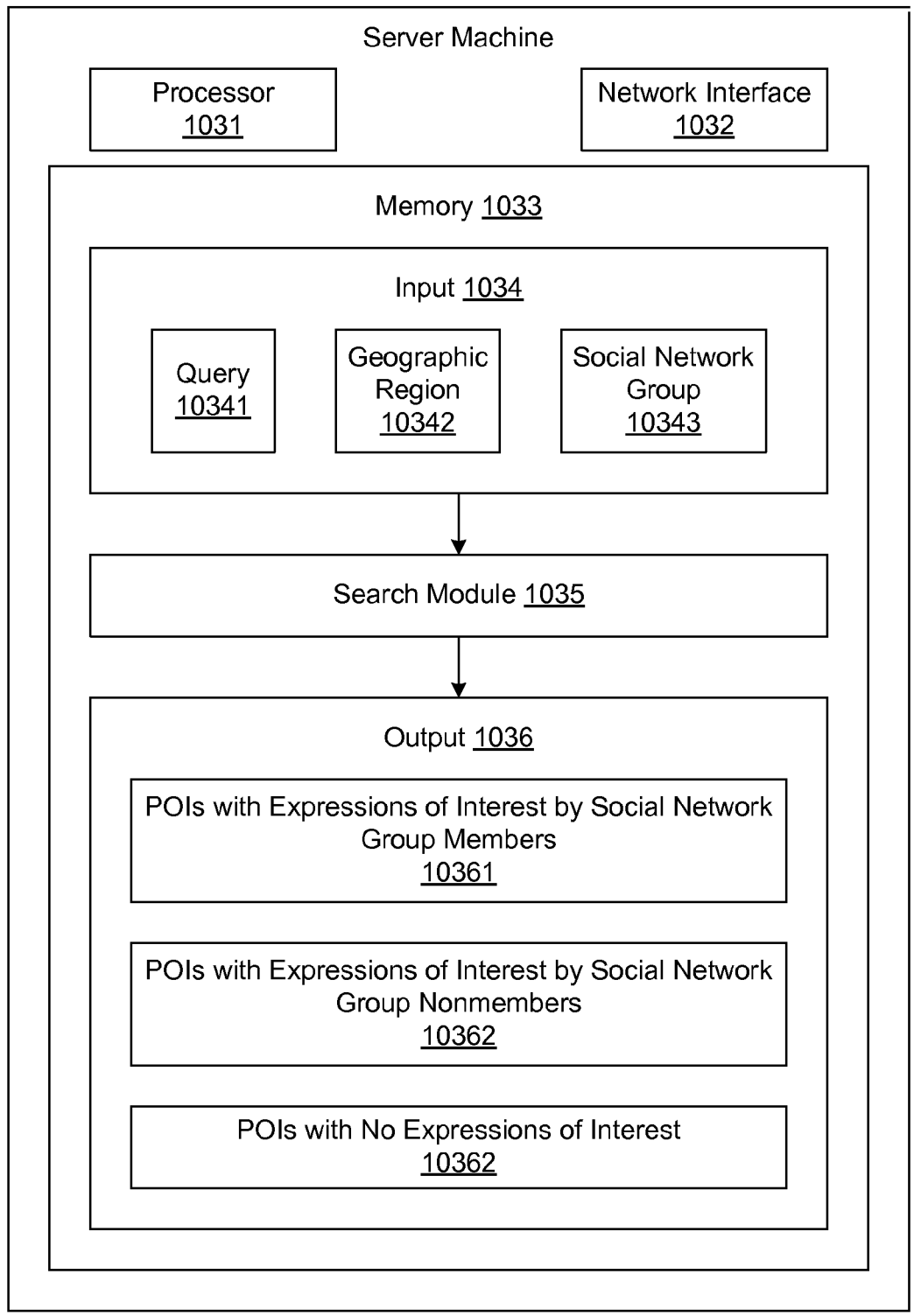
FIG. 3 illustrates a block diagram of an example of a server machine shown in FIG. 1.

FIG. 3 illustrates a block diagram of an example of a server machine 103 shown in FIG. 1. As shown, the server machine 103 may include a processor 1031, a network interface 1032, and a memory 1033. The processor 1031 is configured to execute computer instructions that are stored in a computer-readable medium, for example, the memory 1033. The processor 1031 may be a central processing unit (CPU). The network interface 1032 is configured to allow the server machine 103 to transmit and receive data in the network 102. The network interface 1032 may include one or more network interface cards (NICs). The memory 1033 may have a search module 1035 and may temporarily store input data 1034 and output data 1036.

A user input, or request, may include a query 10341, which may be, e.g., "Indian restaurant". The query 10341 may be associated with a geographic region 10342, which may be, e.g., "within 25 miles of Palo Alto, Calif.". The server machine 103 may provide a user interface for an end-user to input a zip code (e.g., 94303) and a range (e.g., 25 miles). The server machine 103 may also provide a map for an end-user to select an area (e.g., Palo Alto, Calif.). The query 10341 may also be associated with a social network group 10343, e.g., the end-user's friend circle. The social network group 10343 may be from the end-user, or may be provided by the server machine 103 automatically when the end-user is signed in to the social networking site.

The search module 1035 may search the database 104 in response to the user request to generate a set of matching POIs, rank the matching POIs, and generate the output data 1036 for displaying. The search module 1035 may first divide the set of matching POIs into a number of subsets according to information from the end-user's social graph, putting POIs with expressions of interest by social network group members into a highest ranking subset 10361, POIs with expressions of interest by social network group nonmembers into a second highest ranking subset 10362, and POIs with no expression of interest of members of the social networking service into the lowest ranking subset 10362. The search module 1035 may then assign sub-ranks to POIs within each subset, giving POIs with expressions of interest of experts the highest sub-rank in that subset.

Figure 4:
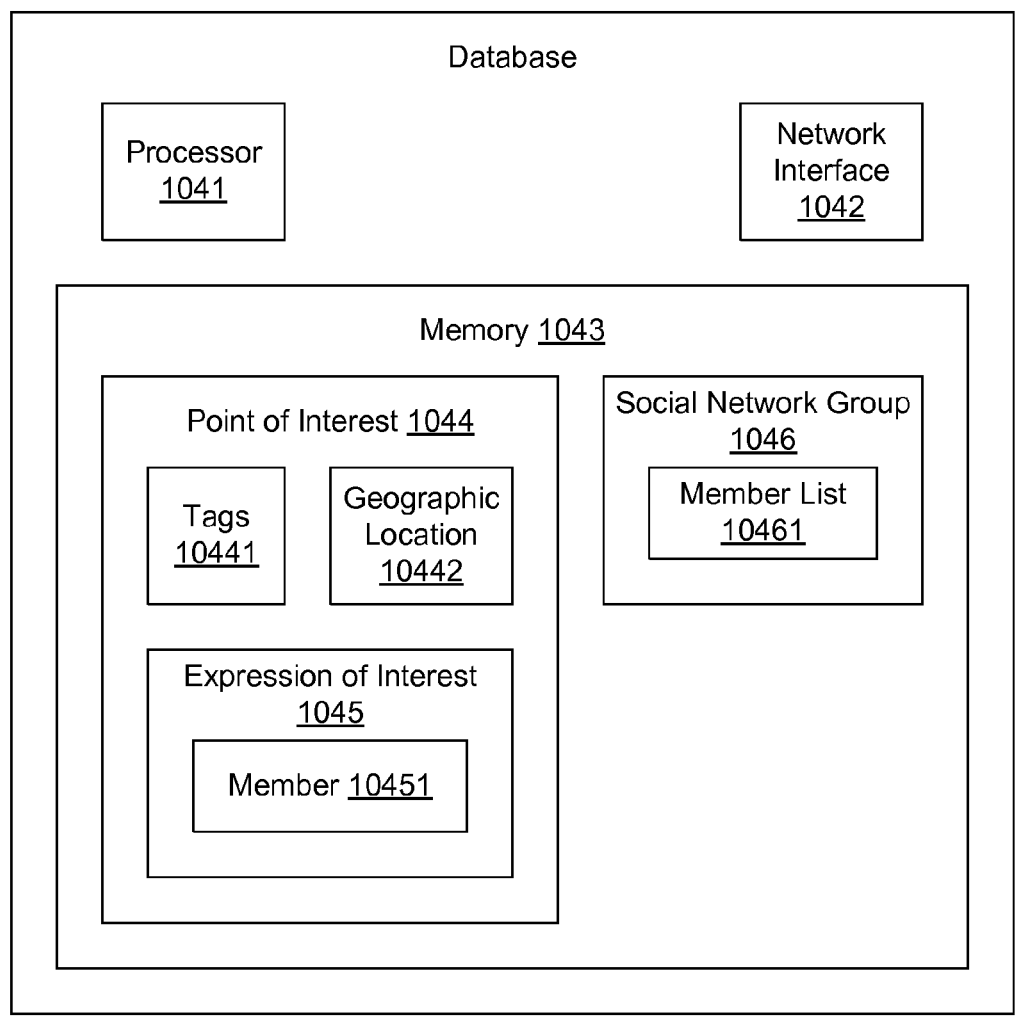
FIG. 4 illustrates a block diagram of an example of a database shown in FIG. 1.

FIG. 4 illustrates a block diagram of an example of a database 104 shown in FIG. 1. As shown, the database 104 may include a processor 1041, a network interface 1042, and a memory 1043. The processor 1041 is configured to execute computer instructions that are stored in a computer-readable medium, for example, the memory 1043. The processor 1041 may be a central processing unit (CPU). The network interface 1042 is configured to allow the database 104 to transmit and receive data in the network 102. The network interface 1042 may include one or more network interface cards (NICs). The memory 1043 stores data which may be searched when generating recommendations of POIs in response to a request. As illustrated, the memory 1043 may have a point of interest section 1044 and a social network group section 1046.

The point of interest section 1044 may store data about POIs, and may include a tag section 10441 for storing tags, a geographic location section 10442 for storing geographic locations of the POIs, and an expression of interest section 1045 for storing expressions of interest associated with the POIs. The expression of interest section 1045 may have a member section 10451 for storing expressions of interest associated with members of the social network service. The social network group section 1046 may store information about members of social network groups of each member of the social networking service, and may have a member list section 10461 for storing a member list for each social network group of each member of the social networking service. It should be understood that the social network group section 1046 may be stored in a separate database.

Figure 5:
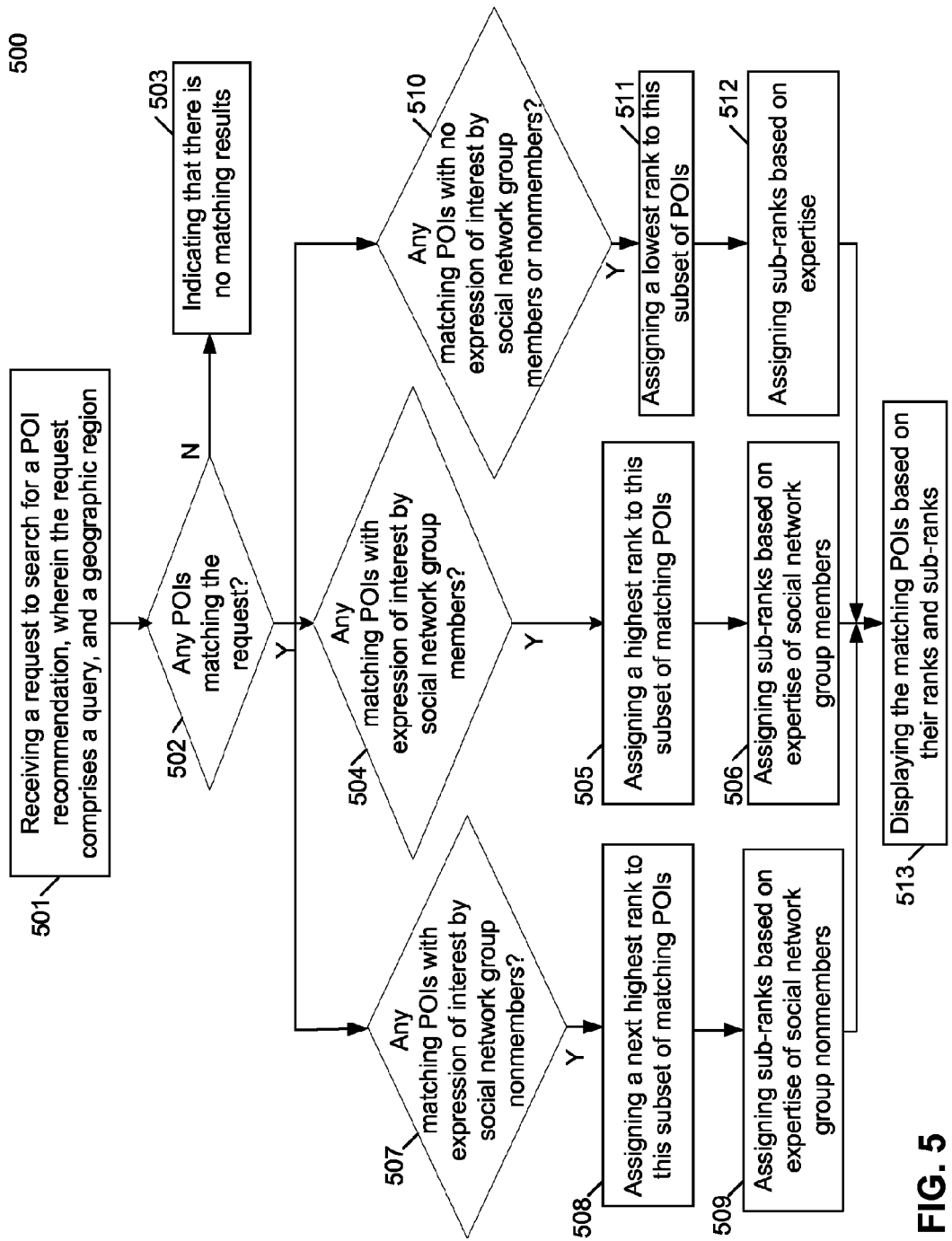
FIG. 5 illustrates an example process by which recommendations of points of interest may be generated in a social networking service.

FIG. 5 illustrates a process by which recommendations of points of interest may be generated in a social networking service.

As shown, at 501, a request to search for a POI may be received. The request may include a query (e.g., "Indian restaurant"). The query may be associated with a geographic region (e.g., within 25 miles from Palo Alto, Calif.). The query may also be associated with a social network group (e.g., an end-user's friend circle). In one embodiment, the social network group information may be from the end-user. In one embodiment, the social network group information may be provided by the social networking service automatically when the end-user is signed in.

At 502, it may be determined whether there are any POIs matching the query and the geographic region. If not, at 503, it may be displayed that there is not any matching POI. If there are POIs matching the query and the geographic region, it may be determined at 504 whether there are any matching POIs with expressions of interest by social network group members.

If yes, at 505, a highest rank may be assigned to this subset of POIs. At 506, sub-ranks may be assigned to POIs in the highest rank subset based on expertise of social network group members. At 507, it may be determined whether there are any matching POIs which are not associated with expressions of interest by social network group members, but are associated with expressions of interest by social network group nonmembers.

If yes, at 508, a second highest rank may be assigned to this subset of POIs. At 509, sub-ranks may be assigned to POIs in the second highest rank subset based on expertise of nonmembers. At 510, it may be determined whether there are any POIs which are not associated with any expression of interest by members of the social networking service. If yes, at 511, a lowest rank may be assigned to this subset of POIs.

At 512, sub-ranks may be assigned to POIs in the lowest rank subset based on expertise. The expertise may be based on, e.g., previous purchases. At 513, POIs may be displayed according to their ranks and sub-ranks, from the highest to the lowest.

Figure 6:
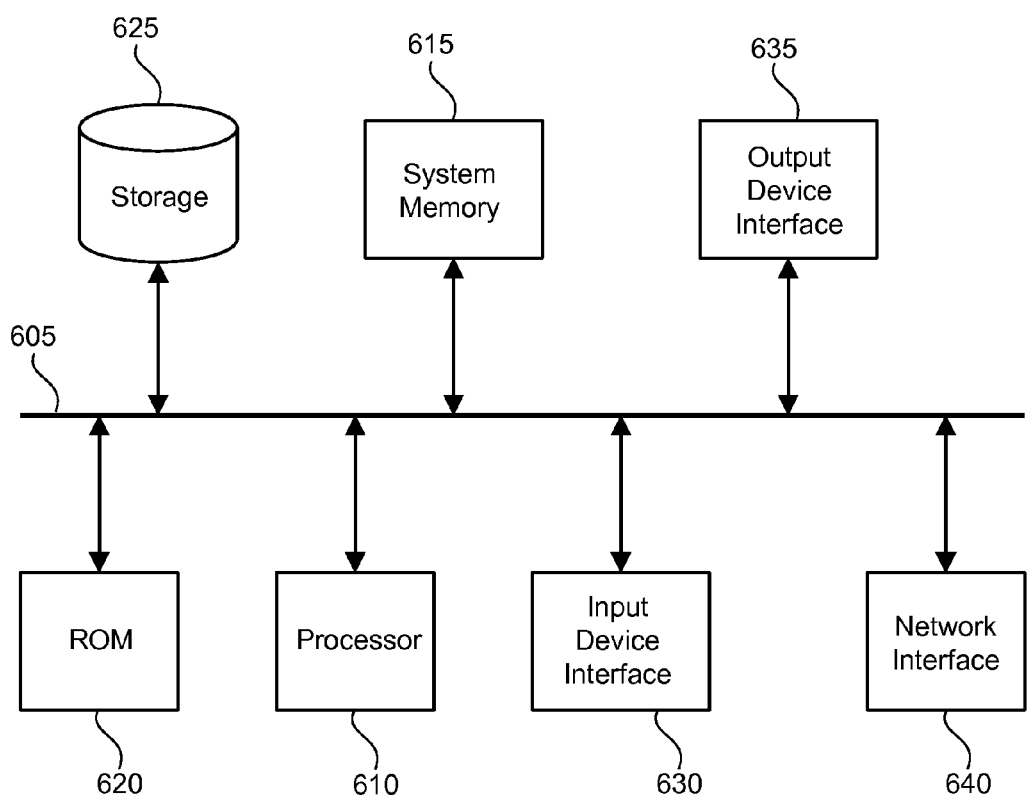
FIG. 6 conceptually illustrates an example electronic system with which some implementations of the subject technology are implemented.

FIG. 6 conceptually illustrates an electronic system 600 with which some implementations of the subject technology are implemented. For example, one or more of the user devices 101-1 or 101-2, or the server machine 103 may be implemented using the arrangement of the electronic system 600. The electronic system 600 can be a computer (e.g., a mobile phone, PDA), or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, an input device interface 630, an output device interface 635, and a network interface 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some implementations of the subject technology use a mass-storage device (for example a magnetic or optical disk and its corresponding disk drive) as the permanent storage device 625.

Other implementations use a removable storage device (for example a floppy disk, flash drive, and its corresponding disk drive) as the permanent storage device 625. Like the permanent storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the processes of the subject technology are stored in the system memory 615, the permanent storage device 625, or the read-only memory 620. For example, the various memory units include instructions for generating recommendations of points of interest to visit in accordance with some implementations. From these various memory units, the processing unit(s) 610 retrieves instructions to execute and data to process in order to execute the processes of some implementations.

The bus 605 also connects to the input and output device interfaces 630 and 635. The input device interface 630 enables the user to communicate information and select commands to the electronic system. Input devices used with input device interface 630 include, for example, alphanumeric keyboards and pointing devices (also called "cursor control devices"). Output device interfaces 635 enables, for example, the display of images generated by the electronic system 600. Output devices used with output device interface 635 include, for example, printers and display devices, for example cathode ray tubes (CRT) or liquid crystal displays (LCD). Some implementations include devices for example a touchscreen that functions as both input and output devices.

Finally, as shown in FIG. 6, bus 605 also couples electronic system 600 to a network (not shown) through a network interface 640. In this manner, the electronic system 600 can be a part of a network of computers (for example a local area network ("LAN"), a wide area network ("WAN"), or an Intranet, or a network of networks, for example the Internet. Any or all components of electronic system 600 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase for example an "aspect" does not imply that the aspect is essential to the subject technology or that the aspect applies to all configurations of the subject technology. A disclosure relating to an aspect may apply to all configurations, or one or more configurations. A phrase for example an aspect may refer to one or more aspects and vice versa. A phrase for example a "configuration" does not imply that such configuration is essential to the subject technology or that such configuration applies to all configurations of the subject technology. A disclosure relating to a configuration may apply to all configurations, or one or more configurations. A phrase for example a configuration may refer to one or more configurations and vice versa.

What is claimed is:

1. A computer-implemented method comprising:
   receiving a request to search for a point of interest recommendation, the request including a query and a geographic region, the request being associated with a social network group;
   determining, by a processor, a set of points of interest responsive to the query, each point of interest associated with a geographic location in the geographic region;
   ordering the points of interest based on the relevance of the points of interest to the request, the relevance of each point of interest based on whether the point of interest includes an expression of interest, whether the expression of interest is by a member of the social network group and one of the frequency and number of interactions of the member with data similar to the query; and
   providing for display at least a subset of the set of points of interest based on the order,
   wherein the ordering the points of interest comprises 1) assigning a highest rank to a first subset of points of interest which are associated with expressions of interest from members of the social network group, 2) assigning a second highest rank to a second subset of points of interest which are associated with expressions of interest from nonmembers of the social network group who use a social networking service, and 3) assigning a lowest rank to a third subset of points of interest which are not associated with expressions of interest from members of a social networking service.

2. The method of claim 1, wherein the relevance of each point of interest is further based on one of the frequency and number of interactions of the member with data similar to a content item.

3. The method of claim 1, wherein the social network group comprises at least one social circle associated with an end-user.

4. The method of claim 1, further comprising: in the first subset of points of interest, assigning sub-ranks based on expertise of the members.

5. The method of claim 1, further comprising: in the second subset of points of interest, assigning sub-ranks based on expertise of the nonmembers.

6. The method of claim 1, further comprising: in the third subset of points of interest, assigning sub-ranks based on expertise.

7. The method of claim 1, wherein the social network group is included in the request.

8. A non-transitory computer-readable medium for generating recommendations of points of interest to visit, the computer-readable medium comprising instructions that, when executed by a computer, cause the computer to:
   receive a request to search for a point of interest recommendation, the request including a query, a geographic region, and a social network group;
   determine a set of points of interest responsive to the query, each point of interest associated with a geographic location in the geographic region;
   order the points of interest based on the relevance of the points of interest to the request, the relevance of each point of interest based on whether the point of interest includes an expression of interest, whether the expression of interest is by a member of the social network group and one of the frequency and number of interactions of the member with data similar to the query; and provide for display at least a subset of the set of points of interest based on the order, wherein the order the points of interest comprises 1) assign a highest rank to a first subset of points of interest which are associated with expressions of interest from members of the social network group, 2) assign a second highest rank to a second subset of points of interest which are associated with expressions of interest from nonmembers of the social network group who use a social networking service, and 3) assign a lowest rank to a third subset of points of interest which are not associated with expressions of interest from members of a social networking service.

9. The non-transitory computer-readable medium of claim 8, wherein the relevance of each point of interest is further based on one of the frequency and number of interactions of the member with data similar to a content item.

10. The non-transitory computer-readable medium of claim 8, wherein the social network group comprises at least one social circle associated with an end-user.

11. A system comprising:
a computer comprising:
an input module for receiving a request to search for a point of interest recommendation, the request including a query and a geographic region, and associated with a social network group;
a search module for determining a set of points of interest responsive to the query, each point of interest associated with a geographic location in the geographic region, and for ordering the points of interest based on whether the point of interest includes an expression of interest by a member of the social network group and one of the frequency and number of interactions of the member with data similar to the query; and
an output module for providing for display at least a subset of the set of points of interest based on the order,
wherein the ordering the points of interest comprises 1) assigning a highest rank to a first subset of points of interest which are associated with expressions of interest from members of the social network group, 2) assigning a second highest rank to a second subset of points of interest which are associated with expressions of interest from nonmembers of the social network group who use a social networking service, and 3) assigning a lowest rank to a third subset of points of interest which are not associated with expressions of interest from members of a social networking service.

12. The system of claim 11, wherein the relevance of each point of interest is further based on one of the frequency and number of interactions of the member with data similar to a content item.

13. The system of claim 11, wherein the social network group comprises at least one social circle associated with an end-user.

14. The system of claim 11, wherein the search module further assigns sub-ranks in the first subset of points of interest based on expertise of the members.

* * * * *